US008806361B1

(12) United States Patent
Noel et al.

(10) Patent No.: US 8,806,361 B1
(45) Date of Patent: Aug. 12, 2014

(54) MULTI-LANE TIME-SYNCHED VISUALIZATIONS OF MACHINE DATA EVENTS

(71) Applicant: Splunk Inc., San Francisco, CA (US)

(72) Inventors: Cary Noel, Pleasant Hill, CA (US); John Coates, Berkeley, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 14/046,767

(22) Filed: Oct. 4, 2013

Related U.S. Application Data

(60) Provisional application No. 61/883,071, filed on Sep. 26, 2013, provisional application No. 61/878,498, filed on Sep. 16, 2013.

(51) Int. Cl.
*G06F 3/048* (2013.01)
*G06F 3/0482* (2013.01)

(52) U.S. Cl.
CPC .................................. *G06F 3/0482* (2013.01)
USPC .......................................................... 715/771

(58) Field of Classification Search
CPC ............. G06Q 10/109; G06Q 30/0201; G06F 11/0751; G06F 17/3004; G06F 11/079
USPC .......................................................... 715/771
See application file for complete search history.

(56) References Cited

U.S. PATENT DOCUMENTS

2012/0173985 A1* 7/2012 Peppel .......................... 715/730

* cited by examiner

*Primary Examiner* — Omar Abdul-Ali
(74) *Attorney, Agent, or Firm* — Hickman Palermo Truong Becker Bingham Wong LLP; Kirk D. Wong

(57) ABSTRACT

A visualization can include a set of swim lanes, each swim lane representing information about an event type. An event type can be specified, e.g., as those events having certain keywords and/or having specified value(s) for specified field(s). The swim lane can plot when (within a time range) events of the associated event type occurred. Specifically, each such event can be assigned to a bucket having a bucket time matching the event time. A swim lane can extend along a timeline axis in the visualization, and the buckets can be positioned at a point along the axis that represents the bucket time. Thus, the visualization may indicate whether events were clustered at a point in time. Because the visualization can include a plurality of swim lanes, the visualization can further indicate how timing of events of a first type compare to timing of events of a second type.

20 Claims, 16 Drawing Sheets

Notable Events: cnoel

Select all Unselect all < prev [1] 2 3 4 5 6 7 8 9 10 next >   Edit selected events | Edit all matching events

| | Time | Security Domain | Title | Urgency | Status | Owner | |
|---|---|---|---|---|---|---|---|
| ☐ ▼ | 6/4/13 11:23:02.000 AM | Access | Excessive Failed Logins | △ Medium | New | unassigned | View details |
| ☐ ▼ | 6/4/13 11:22:52.000 AM | Endpoint | Prohibited Process detected (telnetd) | △ Medium | New | unassigned | View details |
| ☐ ▼ | 6/4/13 11:22:12.000 AM | Access | Excessive Failed Logins | ⊙ High | New | unassigned | View details |
| ☐ ▼ | 6/4/13 11:21:36.000 AM | Access | Insecure Or Cleartext Authentication Detected | △ Medium | New | unassigned | View details |
| ☐ ▼ | 6/4/13 11:21:11.000 AM | Threat | Watchlisted Event Observed | ⊙ High | New | unassigned | View details |
| ☐ ▼ | 6/4/13 11:21:10.000 AM | Audit | Anomalous Audit Trail Activity Detected On COREDEV-004 | ⊙ Low | New | unassigned | View details |
| ☐ ▼ | 6/4/13 11:21:01.000 AM | Access | Brute Force Access Behavior Detected From 10.11.36.25 | ⊙ High | New | unassigned | View details |
| ☐ ▼ | 6/4/13 11:21:01.000 AM | Access | Insecure Or Cleartext Authentication Detected | ⊙ High | New | unassigned | View details |
| ☐ ▼ | 6/4/13 11:21:01.000 AM | Access | Insecure Or Cleartext Authentication Detected | ⊙ High | New | unassigned | View details |
| ☐ ▼ | 6/4/13 11:20:50.000 AM | Endpoint | High Or Critical Priority Host With Malware Detected | ⊙ High | New | unassigned | View details |

< prev [1] 2 3 4 5 6 7 8 9 10 next >

MULTI-LANE TIME-SYNCHED VISUALIZATIONS OF MACHINE DATA EVENTS

CROSS-REFERENCE TO RELATED APPLICATIONS

This application claims the benefit of each of U.S. Provisional Application No. 61/878,498, filed on Sep. 16, 2013, and U.S. Provisional Application No. 61/883,071, filed on Sep. 26, 2013. Each of these applications is hereby incorporated by reference in its entirety for all purposes.

TECHNICAL FIELD

The present disclosure relates generally to time-synched visualizations of events of a variety of types.

BACKGROUND

Businesses and their data analysts face the challenge of making sense of and finding patterns in the increasingly large amounts of data of all types—big data—that such businesses generate and collect. For example, accessing computer networks and transmitting electronic communications across them generates massive amounts of data, including such types of data as machine data and Web logs. Identifying patterns in this data, once thought relatively useless, has proven to have great value. In some instances, pattern analysis can indicate which patterns are normal and which ones are unusual. Detection of the unusual patterns can allow a computer system manager to investigate the circumstances and determine whether a computer system security threat exists.

As another example, analysis of such data allows businesses to understand how their employees, potential consumers, and/or Web visitors use the company's online resources. Such analysis can provide businesses with operational intelligence, business intelligence, and an ability to better manage their IT resources. For instance, such analysis may enable a business to better retain customers, meet customer needs, or improve the efficiency of the company's IT resources.

Despite the value that one can derive from the underlying data described, making sense of this data to realize that value takes effort. In particular, patterns in underlying data may be difficult to identify or understand when analyzing specific behaviors in isolation, often resulting in the failure of a data analyst to notice valuable correlations in the data from which the business can draw strategic insight.

SUMMARY

In accordance with the teachings provided herein, in some embodiments, systems and methods are provided for visualizing temporal information pertaining to various types of events. The visualization can include a set of swim lanes, each swim lane representing information about an event type (e.g., a set of events meeting specified criteria). Each event type may be defined by a query specifying criteria for the selection of events, such that events identified in response to the query are defined as being of the event type. For example, an event type can include those events having a particular keyword or keywords and/or a particular value or values for a given field or fields (e.g., an event type could include all events with a "POST" method or that contain the keyword "POST").

As described in greater detail below, the events for which visualization methods are provided herein can include any or all of the following: (1) time-stamped segments of raw data, unstructured data, or machine data (or transformed versions of such data); (2) the kinds of events analyzed by vendors in the Security Information and Event Management ("SIEM") field; (3) any other logical piece of data (such as a sensor reading) that was generated at or corresponds to a fixed time (thereby enabling association of that piece of data with a time stamp representing the fixed time); and (4) occurrences where some combination of two or more of any of the foregoing types of events either meets specified criteria or was manually selected by a data analyst as notable or a cause for an alert.

The swim lane may run along a time axis (such as a horizontal time axis) representing a fixed time period, thus enabling plotting representations of the events of the type associated with the swim lane along the axis to indicate when such events occurred within the fixed time period that the axis defines. Specifically, each such event can be assigned to a bucket having a bucket time that corresponds to the time that the event's time stamp represents. Depending on the embodiment, each bucket may be configured to have one, or to have more than one, event assigned to it. If a bucket has only one event, its bucket time may correspond to the time stamp of the event that it contains; if a bucket has multiple events, its bucket time may correspond to a time range encompassing the time stamps of the underlying events in the bucket. A visual indicator, such as a color or color shade of the bucket, may indicate the number of events that a bucket represents, such as with lighter shades indicating few underlying events in a bucket and darker shades indicating many underlying events in the bucket.

As mentioned, a swim lane can extend along an axis in the visualization, and representations of the buckets can be positioned at a point along the axis that represents the bucket time. With the additional use of color or shading to indicate the number of events that a bucket contains, the visualization may indicate for each swim lane how closely together in time events that meet specified criteria (e.g., events of a particular type) are clustered. Because the visualization can include a plurality of swim lanes, the visualization can further indicate how timing of events of a first type compare to timing of events of a second type, enabling a data analyst to notice interesting correlations between the timing of events meeting different criteria.

In some embodiments, a computer-implemented method is provided. The method includes receiving a selection of a time period through a graphical user interface. For each of a plurality of event types that define criteria for selection of events, a set of events is identified. Each event in the set of events matches the event type. Each event in the set of events is associated with an event time that is within the time period. Further, for each of a plurality of event types that define criteria for selection of events, each event in the set of events is to a bucket in a set of buckets. Each bucket in the set of buckets is associated with a bucket time that is within a time range containing the event times of all the events assigned to the bucket. Further, for each of a plurality of event types that define criteria for selection of events, a swim lane is generated. The swim lane displays a representation of each bucket in the set of buckets at a position along a timeline axis that reflects the bucket time. The generated swim lanes are displayed and are displayed to be parallel to each other. The representation of a bucket in the set of buckets may be displayed in the swim lanes may also indicate a number of events assigned to the bucket.

The representation of a bucket in the set of buckets displayed in the swim lanes may use color or color shading to indicate a number of events assigned to the bucket. The representation of each bucket in the set of buckets displayed in the swim lanes may be of a same size. Each bucket in the set of buckets may contain only one event, and the bucket time for the bucket may match the event time for the event assigned to the bucket. A plurality of events may be assigned to a bucket of the plurality of buckets.

In some instances, the method may further include receiving an input corresponding to an identification of a bucket of the set of buckets represented in one of the generated swim lanes and displaying additional information about one or more events assigned to the identified bucket.

In some instances, the method may also include receiving an input corresponding to an identification of a bucket represented in one of the generated swim lanes displaying at least a portion of one or more events assigned to the identified bucket. In some instances, the method may also include receiving input reflecting selection of a swim lane or a bucket in a swim lane and displaying a drill-down view that provides further information about events in the swim lane.

In some instances, the method may also include receiving input reflecting selection of a swim lane or a bucket in a swim lane and displaying a drill-down view based on a drill-down query different from a query used to select events for the swim lane. The generated swim lanes may be displayed in an order relative to each other. The method may further include receiving an input corresponding to an identification of a new order for displaying the generated swim lanes displaying the generated swim lanes in the new order. A query may include a search criterion corresponding to one of the plurality of event types, and the method may further include retrieving events for the generated swim lane corresponding to the event type using the query.

In some instances, the method may also include displaying a user interface for receiving a search criterion for a field that is defined by a data model; receiving the search criterion through the user interface; receiving, through the user interface, an indication that the search criterion is to be used to generate a swim lane; generating a query to retrieve events corresponding to the search criteria; and using the query to define the event type for the swim lane and to retrieve events relevant to the swim lane.

In some instances, the method may further include periodically storing an intermediate summary. Each intermediate summary in a set of intermediate summaries may summarize events of a same event type. Each intermediate summary may be associated with a time range inclusive of time stamps of the events summarized in the summary. The method may also include retrieving events from an intermediate summary of the set of intermediate summaries to accelerate the generation of one of the generated swim lanes. The time period may include the time range corresponding to the intermediate summary.

In some instances, the method may also include receiving a global constraint specifying criteria that all events represented in displayed swim lanes are to meet. The displayed swim lanes may represent only events that both are of one of the plurality of event types and that also satisfy the global constraint.

In some instances, the method may also include receiving a request identifying a further constraint that events assigned to buckets include only those events related to a particular asset or a particular user; and representing, in the displayed swim lanes, only events that both are of one of the plurality of event types and that also are related to the particular asset or the particular user.

In some instances, the method may also include, for an event type of the plurality of event types, retrieving the set of events from a time-series data store, wherein the retrieved events include raw data, machine data, unstructured data, or transformed raw data.

An event assigned to a bucket of the set of buckets represented in one of the generated swim lanes may include summarized data derived using a data reduction technique. An event assigned to a bucket of the set of buckets represented in one of the generated swim lanes may include a notable event or an alert.

In some instances, the method may also include receiving a selection of one or more buckets and receiving input indicative of a request that a notable event or alert corresponding to the selected one or more buckets be created. The method can further include creating the notable event or alert corresponding to the selected one or more buckets.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The present disclosure is described in conjunction with the appended figures:

FIG. 9 illustrates examples of information pertaining to a set of notable events;

Like reference numbers and designations in the various drawings indicate like elements.

DETAILED DESCRIPTION

Figure 1:
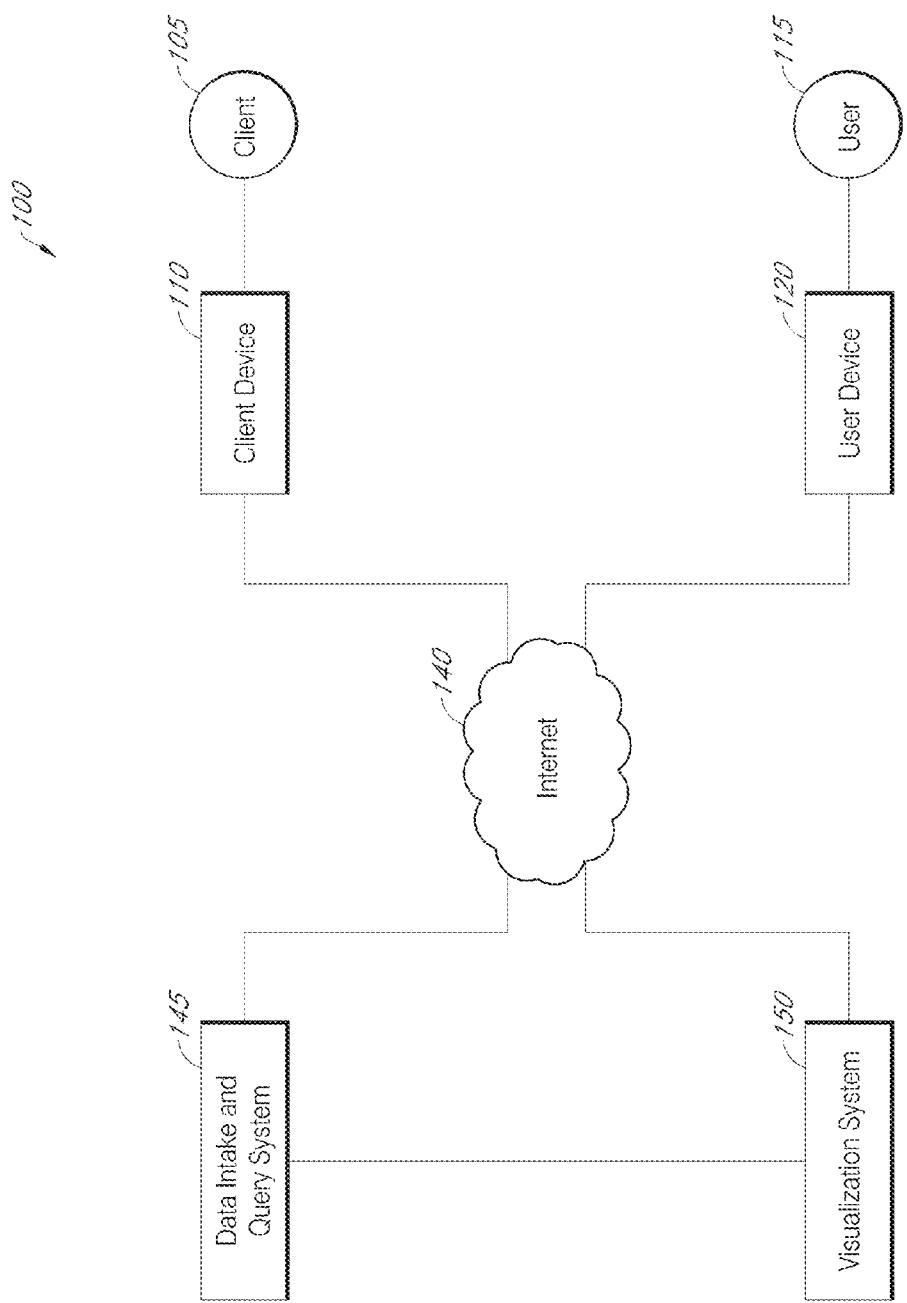
FIG. 1 shows a block diagram of an embodiment of a data management interaction system.

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Referring first to FIG. 1, a block diagram of an embodiment of a data management interaction system 100 is shown. A client 105 can include a party that can define and/or control details as to how events are to be collected, identified or used to extract field values. A view 115 can interact with a visualization system 150 to access information about the events (e.g., when the events, or a subset of the events, occurred).

A client 105 and/or user 115 can interact with a data intake and query system 145 and/or a visualization system 150 via a respective device 110 and/or 120 and a network 140. Data intake and query system 145 and the visualization system 150 can be directly connected, integrated into a same system, or communicate via network 140. Network 140 can include the Internet, a wide area network (WAN), local area network (LAN) or other backbone. It will be understood that, although only one client 105 and user 115 are shown, system 100 can include multiple clients 105 and/or users 115.

Client device 110 and/or user device 120 can each be a single electronic device, such as a hand-held electronic device (e.g., a smartphone). It will be understood that client device 110 and/or user device 120 can also include a system that includes multiple devices and/or components. The device(s) 110 and/or 120 can comprise a computer, such as the desktop computer, a laptop computer or a tablet. In some instances, a party 105 and/or 115 uses different devices at different times to interact with visualization system 150.

User 115 can utilize visualization system 150 in order to view events' absolute and relative timings. The visualization can include a plurality of swim lanes, each corresponding to a certain type of event (e.g., each swim lane displaying events meeting specified criteria) over a time range defined by a time axis along which the swim lane runs. Within a swim lane, a set of buckets identifies when events in each of the buckets occurred. In an exemplary embodiment, buckets can hold a plurality of events, and a face of a displayed bucket (e.g., its color or color shade) indicates the number of events in that bucket. In an alternative embodiment, there is a one-to-one mapping between buckets and events, with each bucket corresponding to exactly one event.

To display the events that the software plots in a swim lane, a query can be generated and executed. The query can specify criteria to use for the selection of events to display in a given swim lane, thereby defining the event type for that swim lane. Such criteria may specify selection of events having a particular keyword or keywords and/or a field or fields with a particular value or values. Because the swim lane displays qualifying events that occur in the time range displayed for the swim lane, the query may likewise specify corresponding time criteria for the selection of events.

As noted, the visualization may include a plurality of swim lanes displaying events of different types in different lanes. This enables a data analyst to easily discover and make sense of correlations and patterns between when events of different types occur. Such correlations and patterns enable the data analyst to make sense of their data. As in other fields, this can be useful in understanding computer security risks (e.g., to identify abnormal event patterns, or event patterns preceding security breaches).

As noted, a query may define the criteria for events to represent in a given swim lane. The intake and query system 145 may have responsibility for processing such a query by retrieving the events meeting the specified criteria—the event type—for a given swim lane and providing the events for display to the visualization system 150.

Exemplary Systems for Generating, Storing and Retrieving Events

As noted, the swim lanes of the present invention may display on a timeline the timing of a variety of different types of events. SPLUNK® ENTERPRISE, which is software produced and sold for on-premise and cloud use by Splunk Inc. of San Francisco, Calif., provides an exemplary system for generating, storing, and retrieving events that can provide the functionality of the data intake and query system 145. While SPLUNK® ENTERPRISE can turn almost any time series data into events of the type that can be visualized by the methods of the present invention, it has gained particular appeal in the market for deriving events from unstructured data and machine data. It is the leading software for providing real-time operational intelligence, enabling organizations to collect, index, and harness machine-generated big data coming from the websites, applications, servers, networks, and mobile devices that power their businesses.

At a high level, SPLUNK® ENTERPRISE may take raw data, unstructured data, or machine data such as a Web log, divide the data up into segments, and optionally transform the data in these segments to produce time-stamped events. The software derives the time stamp for each event by extracting it from the event data itself or by interpolating an event's time stamp relative to other events for which the software can derive a time stamp. SPLUNK®ENTERPRISE then stores the events in a time-series data store against which it can run queries to retrieve events meeting specified criteria, such as having certain keywords and/or having certain value(s) for certain defined field(s).

SPLUNK® ENTERPRISE is particularly noteworthy for employing a so-called late-binding schema. As noted, an event in SPLUNK® ENTERPRISE typically contains an entire segment of raw data (or transformed version of such). To run queries against events other than those involving keyword searches, a schema can be developed. Such a schema may include one or more fields. Each field may be defined for a subset of the events in the data store and specify how to extract a value from each of the subset of events for which the field has been defined. The extraction rule for a field is often done using a regular expression (regex rule), and it is associated with a logical type of information that is contained within an event for which it is defined. The term "late-binding schema" refers to a system such as in SPLUNK® ENTERPRISE where the schema is not defined at index time as with database technology; rather, in a system involving late-binding schema, the schema can be developed on an ongoing basis up until the time it needs to be applied (which is query time, as a query often specifies the criteria for events of interest in terms of events having specified value(s) for specified field(s)). As a data analyst learns more about the data in stored events, in a late-binding schema, he can continue to develop the schema up until the next time it is needed for a query.

Because SPLUNK® ENTERPRISE maintains the underlying raw data and enables application of a late-binding schema, it has great power to enable investigation of issues that arise as a data analyst learns more about the data stored in the system's events.

Splunk Inc. also produces a number of applications that run on top of the SPLUNK® ENTERPRISE platform to provide additional functionality for applications in particular fields. One such example is the SPLUNK® APP FOR ENTERPRISE SECURITY, which provides additional functionality to assist in identifying computer and network security threats from the data ingested and stored by SPLUNK® ENTERPRISE. Besides providing functionality to help with schema creation for data coming from particular data sources popular in the computer and network security context, the SPLUNK® APP FOR ENTERPRISE SECURITY also provides unique visualizations for discovering security threats and enables the creation of so-called "notable events."

A "notable event" can be generated in SPLUNK® APP FOR ENTERPRISE SECURITY in two ways: (1) a data analyst may manually identify a group of two or more events as notable because of some correlation among the events that piqued the analyst's concern, and the manually identified set of events is the notable event, or (2) criteria can be specified that is met by a combination of two or more events, and the set of events that together meet the criteria is the notable event. Optionally, in this latter example, a data analyst may generate a query specifying the criteria for a notable event, and every time a group of two or more events satisfies the criteria, the software generates a notable event; a query of this type is referred to as a "correlation search." It will be appreciated that notable events generated using one or both of these techniques can be represented in a given visualization.

As noted, the types of events to which the visualization methods of the present invention may be applied include any of the types of events or notable events generated by SPLUNK® ENTERPRISE and the SPLUNK® APP FOR ENTERPRISE SECURITY.

Exemplary SIEM Systems for Generating, Storing, and Retrieving Events

While utilizing events including raw data (or transformed raw data) may provide advantages, the events that can be visualized using the methods of the present invention can also include any other logical piece of data (such as a sensor reading) that was generated at or corresponds to a fixed time (thereby enabling association of that piece of data with a time stamp representing the fixed time). Another exemplary source of events in the computer and network security space involves the kinds of events generated and analyzed by vendors in the Security Information and Event Management ("SIEM") field. These vendors produce software that competes with the SPLUNK® APP FOR ENTERPRISE SECURITY.

SIEM vendors have a significant disadvantage. Their software does not retain the entire underlying raw data, nor does it employ a late-binding schema. Rather, at index time, raw data may be divided into segments and a time-stamp derived, as in SPLUNK® ENTERPRISE. But these raw data segments are then processed to extract values for a limited set of fields that are defined for each segment prior to index time. In a method referred to as data reduction, SIEM software then throws away the underlying raw data once values have been extracted for the fields that were defined prior to index time. If it becomes important to look at underlying data later as data issues are discovered, SIEM software cannot provide that capability. Nonetheless, each set of values for fields extracted from a given time-stamped segment may comprise a time-stamped event.

Analogous to the notable events of SPLUNK® APP FOR ENTERPRISE SECURITY, SIEM software may generate so-called "alerts" when combinations of two or more of their data-reduced events are manually identified or meet specified criteria (such criteria may be defined by a so-called "rule," which is analogous to the correlation searches of SPLUNK® APP FOR ENTERPRISE SECURITY).

The events that the methods of the present invention may help to visualize may also include the kinds of data-reduced events and alerts that are produced by SIEM software.

Figure 2:
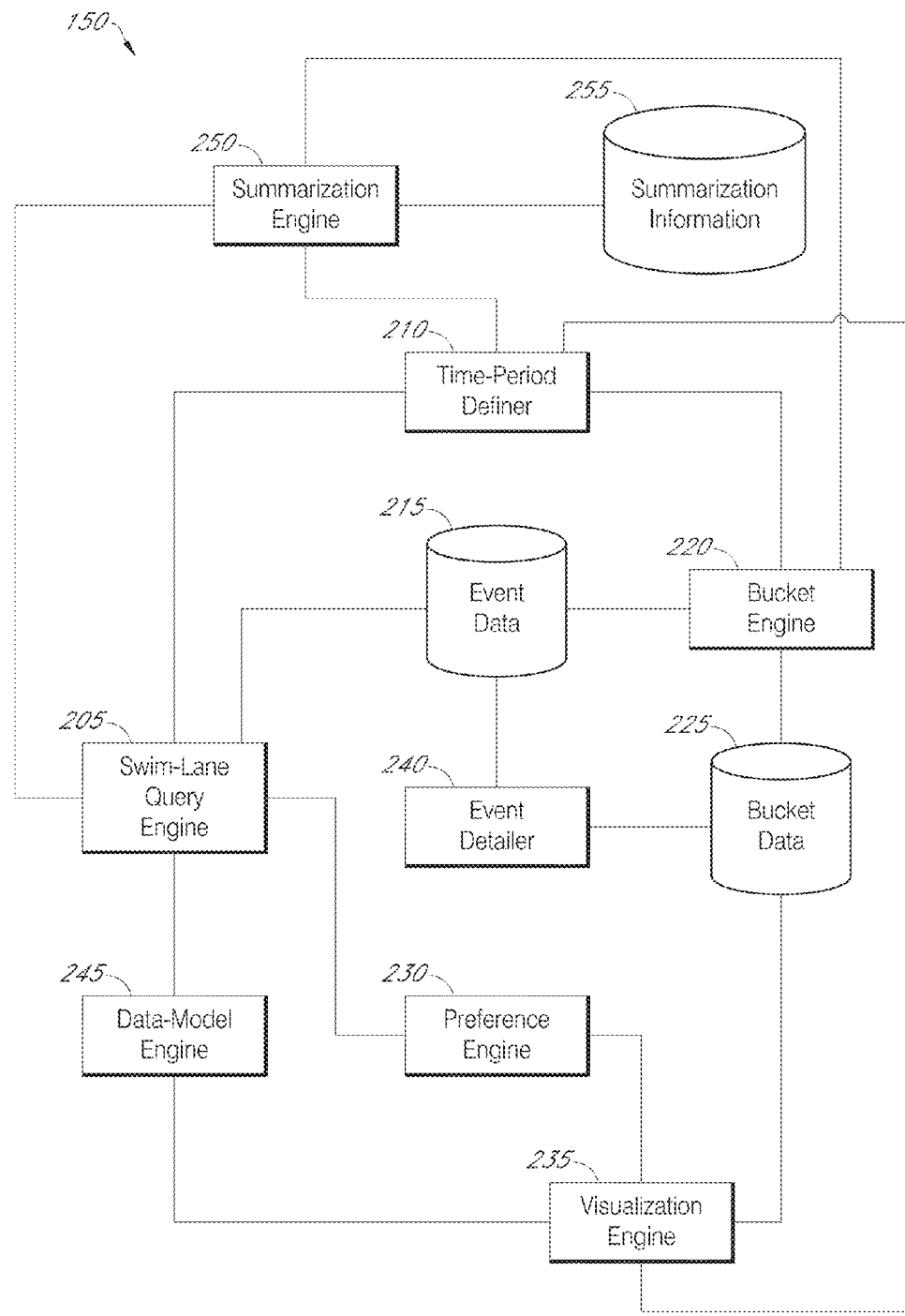
FIG. 2 shows a block diagram of an embodiment of a visualization system.

Referring next to FIG. 2, a block diagram shows an embodiment of visualization system 150. Visualization system 150 can be present on a device (e.g., 110 or 120), run in the cloud, or run in some combination of cloud and on-premise software.

Exemplary Visualization System

Visualization system 150 includes a swim-lane query engine 205 that defines a type of event that will be represented in each swim lane and generates a query that, when executed, will collect events for the swim lane. The event-type definitions can be based on input (e.g., from user 115). The user may specify event-type definitions for a swim lane in one of two ways: (1) by typing in a query specifying the criteria for the events to display in a swim lane, or (2) providing input into a user interface that enables the user to enter criteria for predefined fields of a data model that defines fields for a particular subset of events in the system, enabling the system to then automatically create a query that defines the event-type for a swim lane from the entered criteria.

Typically, an event-type definition for a swim lane specifies much of the criteria for selecting events for a swim lane using a combination of criteria involving key words and/or a specified value or values for a specified field or fields. But the user may also have the option of supplementing the event-type definition for each swim lane with an optional global event limiter that specifies criteria filtering out all events in all swim lanes except those somehow meeting a specific additional criterion (in FIG. 3A, for example, the top of the screen shows that all events in all swim lanes are somehow related to a particular user, cnoel; this instead could have been a global limiter, for example, specifying criteria for filtering all events except those somehow related to a particular asset, such as all events—regardless of user—related to use of a particular server). Such global criteria is just another criterion that could have been applied to qualify events only within a particular swim lane but instead is applied to all events across all swim lanes, and a user interface can be provided enabling a user to specify such global limiter criteria.

A time-period definer 210 can identify a time range to be represented in a visualization. The time range may be defined based on user input or can be set to a default value. Again, time-range options can be presented to a user, and a selected option can be used to define the time range.

Using an event-type definition, and supplemented by a time range specified by the user in time-period definer 210 and/or a global event limiter criterion as specified above, swim-lane query engine 205 can generate a query to collect events of the defined event type that also meet the time range and any specified global criterion limiter. The query can be transmitted to data intake and query system 145 to retrieve events to display in the swim lane.

Upon receiving the events, swim-lane query engine 205 can save the results in an event data store 215 with an identifier of which swim lane is to display the events.

A bucket engine 220 can define how the buckets represent sets of events. Buckets can be configured to exactly one event or can be configured to hold any number of events. In the latter case, bucket engine 220 can identify how to divide the time view into bucket periods. For example, the time view can be divided into a fixed number of bucket periods, or bucket periods can have a fixed duration. All displayed buckets may have a fixed size, which may in turn be determined either to correspond to a certain amount or percentage of time relative to the timeline or so that buckets contain no more than a certain number or percentage of events. In some instances, bucket periods depend on how many events fall within the time view.

Bucket engine 220 can then, for each swim lane, assign each of the swim lane's events to a bucket. Events can be assigned in a manner such that the events assigned to a bucket match the bucket's time. For one-to-one event-to-bucket assignments, the bucket time can be the same as the event time. For buckets configured to hold more than one event, the bucket can contain all events whose time stamp falls with a period of time represented by the bucket. Bucket engine can store information about the buckets and event assignments in a bucket data store 225. For each bucket, stored information can include an identifier of the bucket, an identifier of a swim lane in which to display the bucket, an identifier of events assigned to the bucket, and/or the bucket's time range.

A preference engine 230 can identify preferences pertaining to a visualization showing the swim lanes. The preferences can include which lanes to include in the visualization and/or an order of the lanes. The preferences can identify details as to how buckets are to be represented (e.g., colors or textures or the representations). The preferences can be based on user input specifying the preferences. Default settings can be used if appropriate inputs corresponding to preference identification have not been received.

Using the preferences and bucket data, a visualization engine 235 can generate a visualization that includes swim lanes. Each swim lane can include events of a type determined by swim-lane query engine 205. For each swim lane, visualization engine 235 can select buckets from bucket data store 225 that are associated with the swim lane. The swim lane can extend along a first axis (e.g., a horizontal axis), and buckets can be represented at positions along the first axis representative of the bucket's time. The swim lanes can be aligned parallel to each other, stacked on top of each other above the timeline axis. Thus, a user may be able to visually determine how timing of events represented in one swim lane compare to timing of events represented in another swim lane.

Visualization engine 235 can order the swim lanes in accordance with preferences set by a user. A user may have the ability through the visualization interface to re-arrange the order of the parallel swim lanes, dragging and dropping them to adjust the order above the timeline axis. Such re-ordering abilities enable a user to place two swim lanes representing two different event types of interest next to each other to aid in temporal comparison.

Figure 3A:
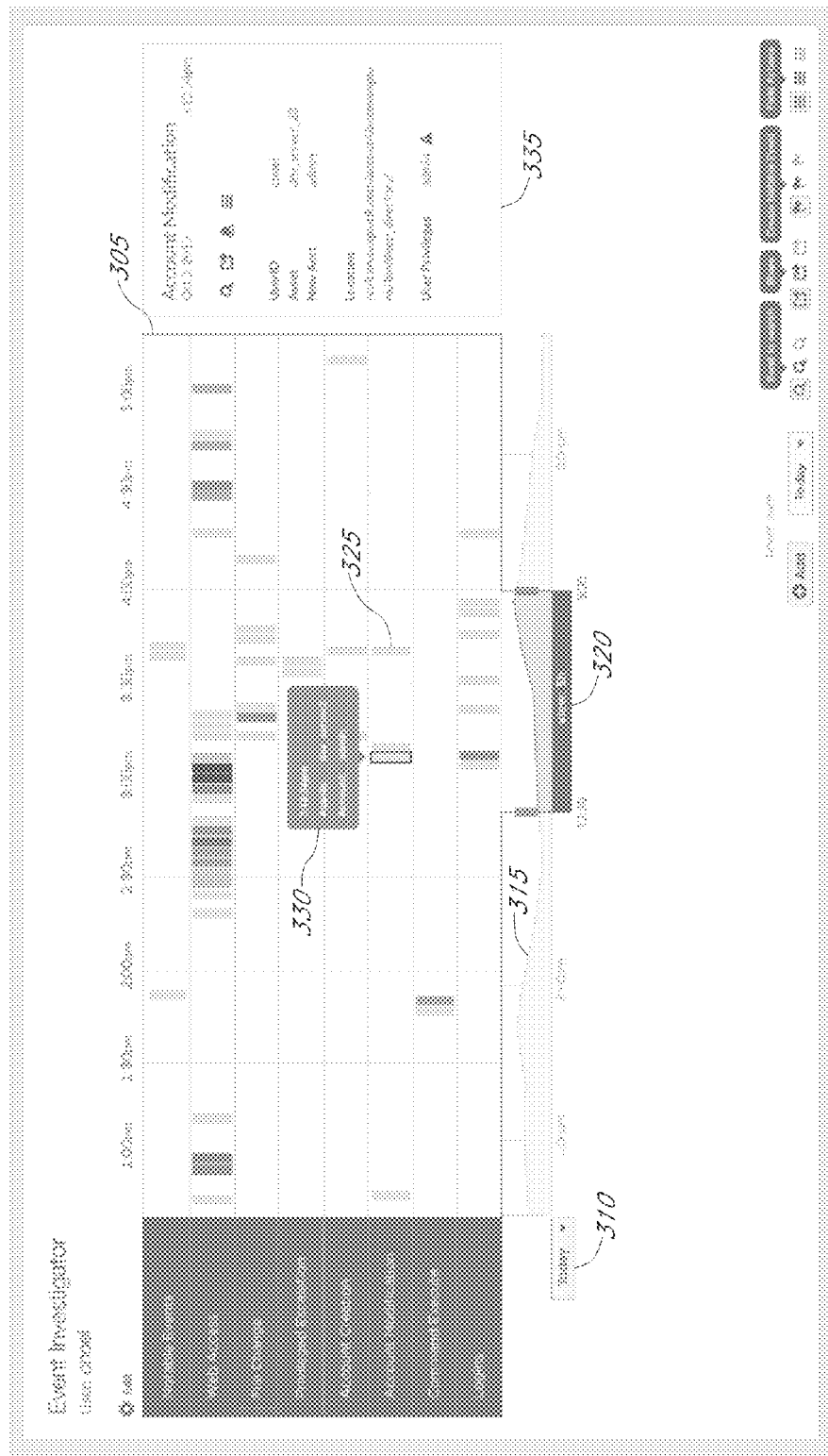
FIGS. 3A and 3B show examples of swim-lane visualizations.
Figure 3B:
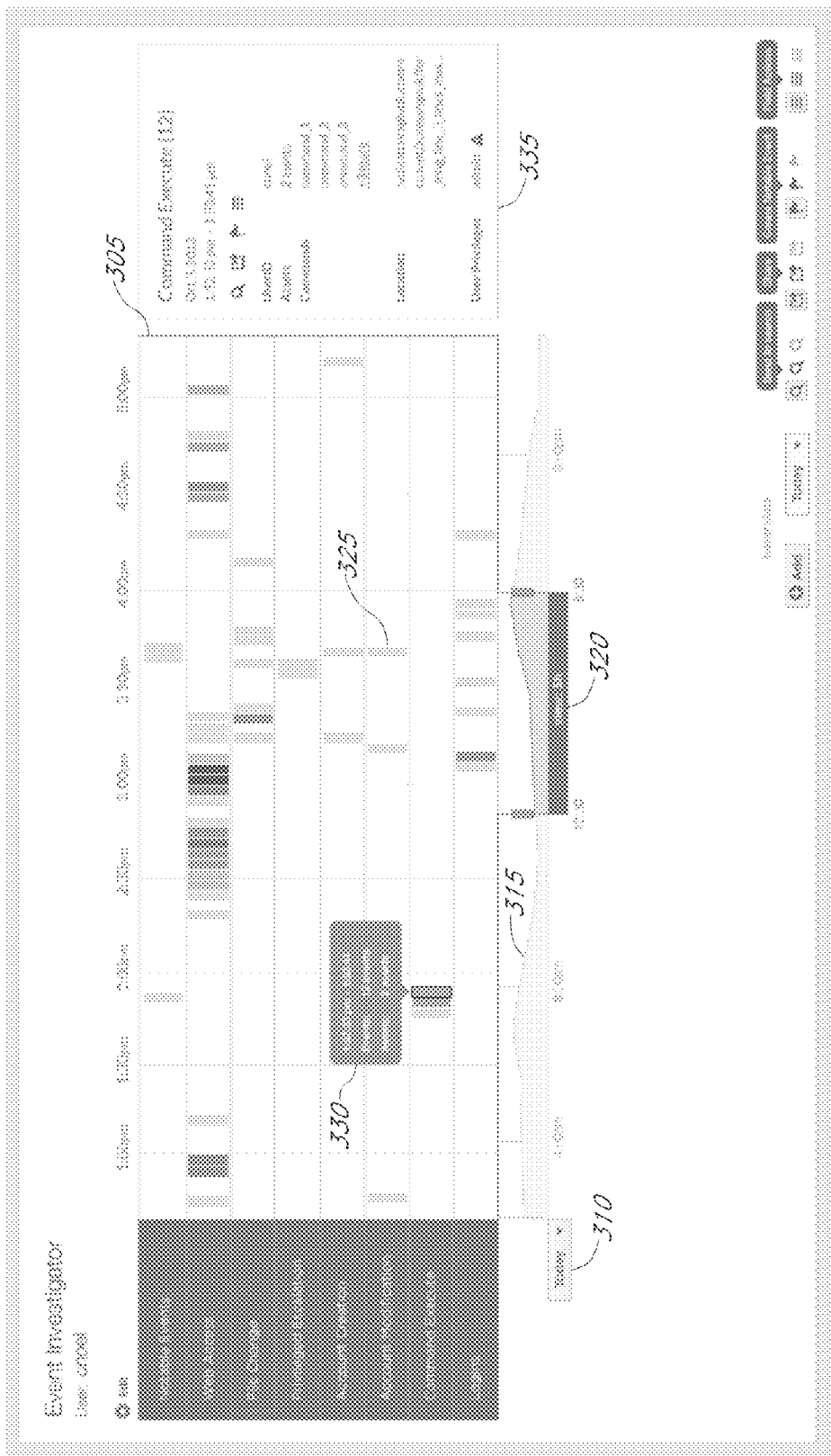

FIGS. 3A and 3B show examples of swim-lane visualizations. In these particular visualizations, all represented events have the optional global criterion limiter limiting the events to those associated with a specific user "cnoel" (again, such a global criterion limiter is optional and may be definable by the user through a variety of user interface tools). The visualization includes a plurality of swim lanes 305, each of which pertains to a different event type. Controls 310 and 320 together allow a user to select a time period of interest. In the depicted visualization, the time period in control 310 is set for "Today." The time view selector 320 allows the user to specify a time view within the time period set by control 310. In the depicted instance, the bottom bar of the selector can be slid along the time period, and the selector can be expanded or contracted using the side handles on the selector. Events of types corresponding to swim lanes that are within the time period can then be retrieved, and swim lanes will display events that are within the selected range.

A bottom population graph 315 shows a time plot of a time-varying count of all retrieved events (e.g., all events of types corresponding to the time period). It will be appreciated that the population graph may, in other embodiments, represent other time-varying counts (e.g., of events of a single type, or of more events than are represented by the swim lanes).

Events can be represented by buckets in the swim lanes. The visualization shows representations of buckets 325 as being vertical bars. The entire horizontal length of the swim lanes correspond to the selected time view. Thus, it will be appreciated that, in this instance, all swim lanes represent events with time stamps within a same time view. (In alternative embodiments, the visualization may be configured to allow time views to be set for individual swim lanes.) The intensity of the color of a bucket (or its color or color shade) indicates the number of events held by the bucket. In the depicted visualization, darker color shades represent more events. A fixed color scaling (e.g., globally fixed or fixed given a particular time-range duration) can be used to determine the intensity, or the intensities may be distributed in a normalized manner, to ensure that differences in colors can be recognized regardless of absolute event-assignment numbers.

Figure 4:
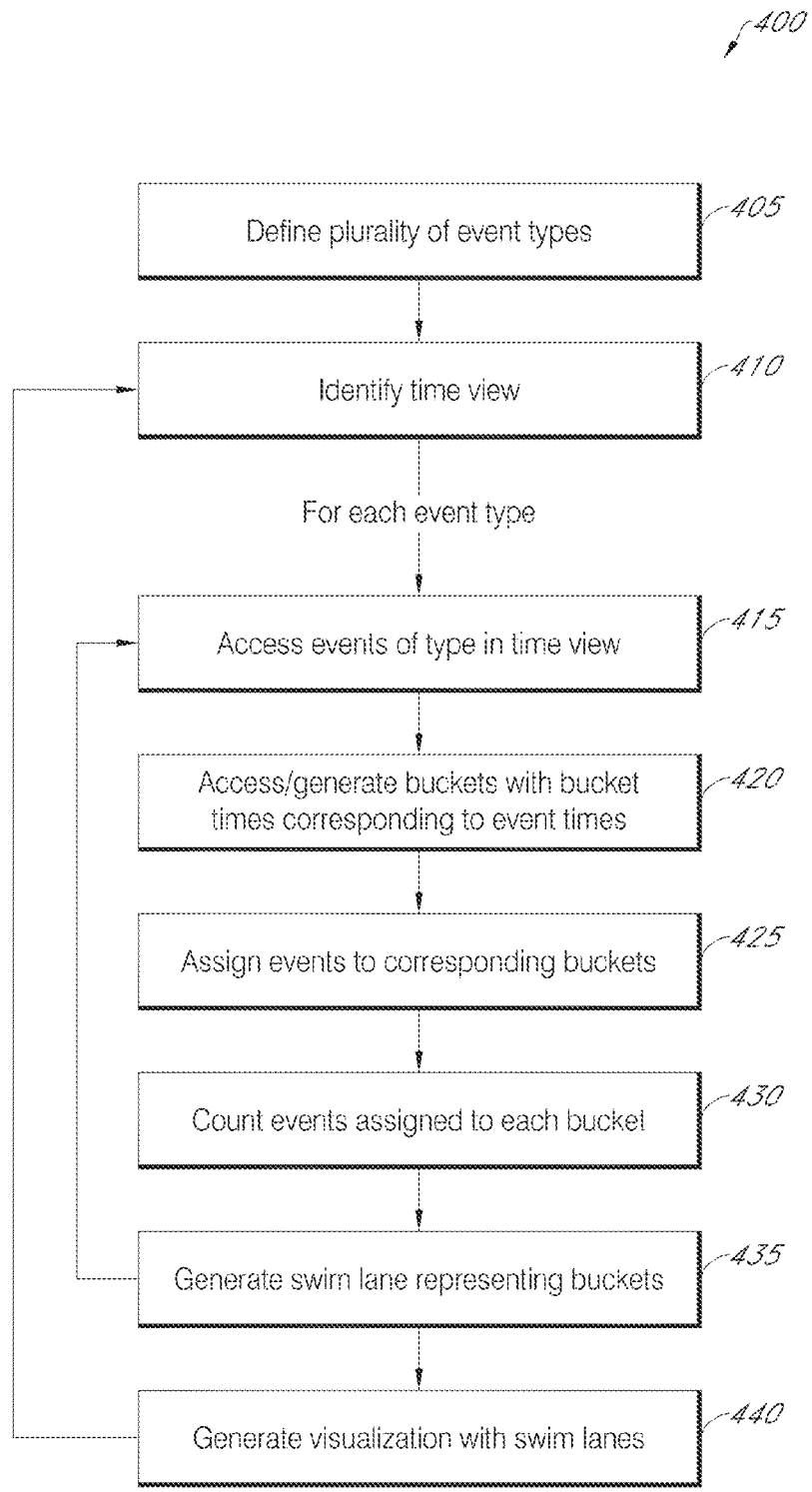
FIG. 4 illustrates a flowchart of an embodiment of a process for generating a visualization indicative of events' timings.

FIG. 4 illustrates a flowchart of an embodiment of a process 400 for generating a visualization indicative of a swim lane view of the timing of events. Process 400 begins at block 405, where swim-lane query engine 205 defines a plurality of event types for a plurality of swim lanes. The event type definition can be a query either entered by the user or generated through a data modeling user interface.

Time-period definer 210 identifies a time view at block 410. The time view can be defined based on a user input, which can include, e.g., identification of a relative time (e.g., last 24 hours) or absolute time, perhaps entered through user interface controls such as 310 and 320. The time view can include a portion (or all) of a time period, where the time period corresponds to one used to indicate which events to retrieve from a data store.

For each of the defined event types, at block 415, swim-lane query engine 205 accesses events of the defined type with time stamps falling within the time period specified by the time view. Specifically, swim-lane query engine 205 can generate a query to locate events that are of the event type within the specified time period. The query can be sent to a data intake and query system 145, and results can be received from the system 145. Swim-lane query engine 205 can store the results in event data store 215. Bucket engine can then access, from event data store 215, events within the time view.

Bucket engine 220 generates buckets with bucket times corresponding to the event times at block 420. The buckets can be accessed if an existing bucket associated with the event type and having a time corresponding to (e.g., including) the bucket time already exists and has not met a threshold number of events (if such a threshold exists). Otherwise, a new bucket can be generated (e.g., having a bucket time that equals the event time or having a bucket time window that includes the event time).

Bucket engine 220 assigns the events to the corresponding buckets at block 425. The assignment can include associating an identifier of the event with an identifier of the bucket and/or incrementing an event count of the bucket. Bucket engine 220 counts events assigned to each bucket at block 430.

Visualization engine 235 generates a swim lane representing the buckets at block 435. The swim lane can extend along an axis and position bucket representations at positions representing the bucket times. Bucket representations can include one or more shared characteristic (e.g., a size, color, and/or orientation) and, in some instances, can include a varying characteristic (e.g., a color intensity or size) that depends on events held by the bucket. For example, the varying characteristic can depend on how many events are in the bucket or whether any event in the bucket includes a particular feature. Blocks 415-435 can be performed for each event type.

Visualization engine 235 generates a visualization with the swim lanes at block 440. The swim lanes can be aligned in the visualization to aid in comparison of bucket times. Blocks 410-440 can be repeated for a new time view. Such repetition can occur, e.g., after detecting an input corresponding to an identification of a new time view. The generation of a new visualization can include modification of an existing visualization.

Exemplary Visualization Customization

Figure 5:
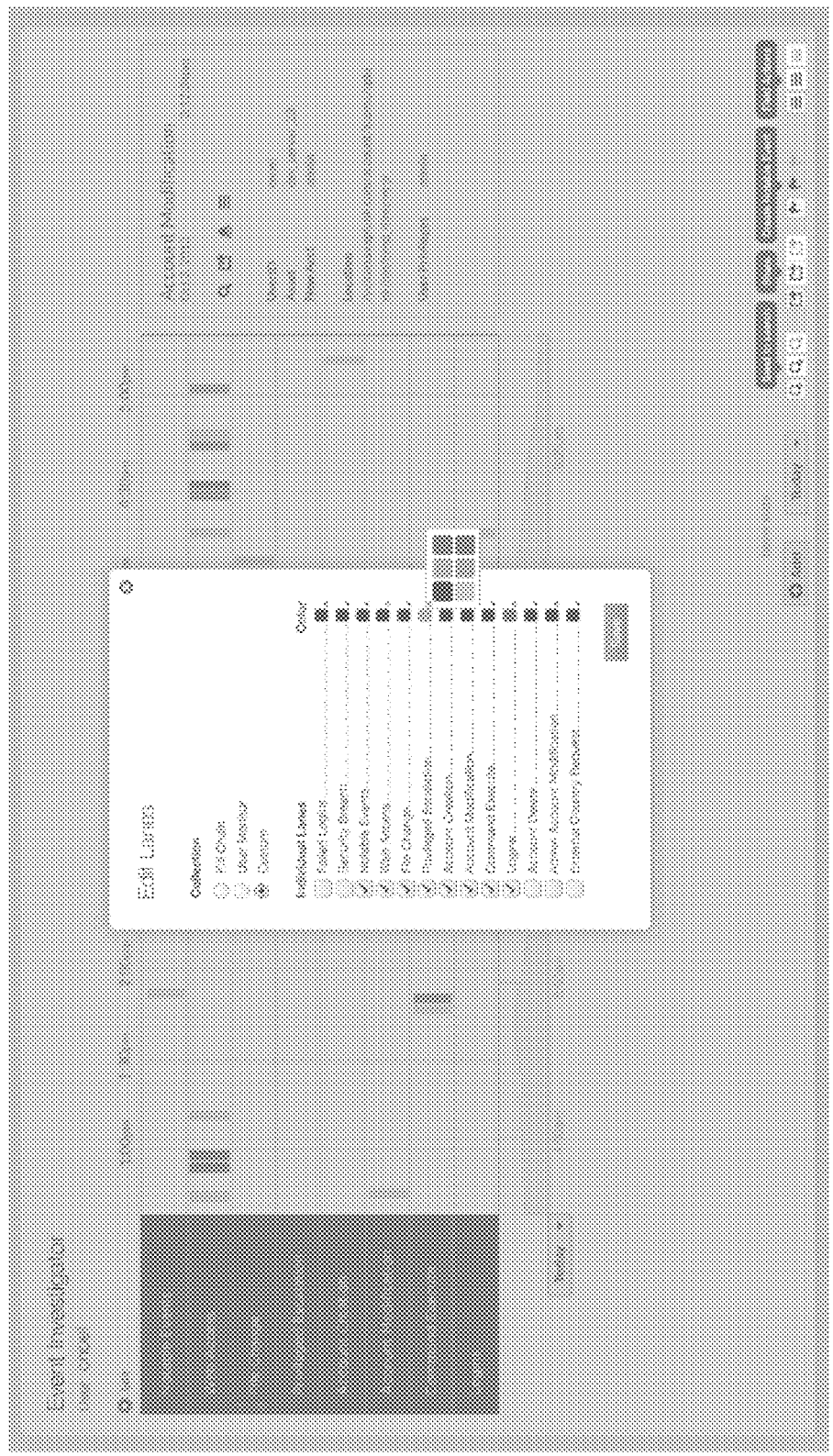
FIG. 5 shows an example of an interface for customizing a swim-lane visualization.

The visualization can be customized based on user preferences. For example, FIG. 5 shows an example of an interface for customizing a swim-lane visualization. The user can set a color for buckets represented in each lane. The user can further check or uncheck boxes to indicate that a lane corresponding to the listed event type is to be included in a visualization.

Predefined collections of swim lanes can be defined and selected as well. This is shown in the top part of the selector. If a particular collection is selected, those swim lanes associated with that collection will be checked in the lower part of the selector and then displayed in the visualization. The "custom" collection enables the turning on and off of each individual swim lane that has been previously defined.

Exemplary Bucket-Specific Event Detail Representations

Returning to FIG. 2, an event detailer 240 can access bucket data and event data in order to collect further detail about events held by any given bucket. This detail may be presented upon detecting a selection or view of any particular bucket or group of buckets.

For example, in FIGS. 3A and 3B, if a user hovers over a bucket representation, a hover window 330 appears that indicates the bucket's time and concise information about event(s) in the bucket (e.g., identification of one or more assets (e.g., devices) corresponding to the events, identification of one or more accounts corresponding to the events, a number of assets corresponding to the events, a number of accounts corresponding to the events and/or a number of events in the bucket).

When a user clicks on a bucket, details pertaining to the bucket may be shown in a sign board 335. The details can include, e.g., times of the event(s) in the bucket, identification of one or more assets (e.g., devices) corresponding to the events, identification of one or more accounts corresponding to the events, identification of one or more user identifiers corresponding to the events, a number of assets corresponding to the events, a number of accounts corresponding to the events and/or a number of events in the bucket. Details shown in the sign board may vary depending on whether a single event is held by the bucket or whether many events are held. In the former case, field values for the event or the event itself may be show in the sign board. FIG. 3A shows an example of a sign board presenting detail for a bucket holding a single event. In the latter case, in addition or instead of such details, population information based on the events in the bucket can be presented (e.g., counts or unique values).

FIG. 3B shows an example of a sign board presenting detail for a bucket holding multiple events. In some instances, a user may be able to drill down into any particular event by clicking on its representation in the sign board, which may cause more detail about the event to be presented or may cause the event itself to be presented.

If a user selects a group of buckets, the sign board 335 may present overview details pertaining to the group of selected buckets (such as the number of events contained in all the selected buckets together).

In response to selecting a bucket, a swim lane, or some other user-interface control, the software may leave the swim lane view and present a drill-down view of the selected information. If the selection was a drill down of a bucket, the view may just present the full details of the underlying events themselves (and perhaps even the query that would generate the events in the selected bucket or the query for the swim lane). If the selection was a drill down of the whole swim lane, the view may again present the full details of all the underlying events in the swim lane. Alternatively, the drill down may be some alternative visualization, or it may be a set of events or visualization that give further information and context than what was originally in the swim lane, equating to a query different than the one that generated the swim lane. The user may have the option of what kind of drill down to show based on selections in a swim lane, of a swim lane, or selections of events across multiple swim lanes. The point is that drill down enables deeper exploration of the information in a swim lane, though what is most valuable to show is context dependent on the types of events shown in the swim lanes.

Figure 6A:
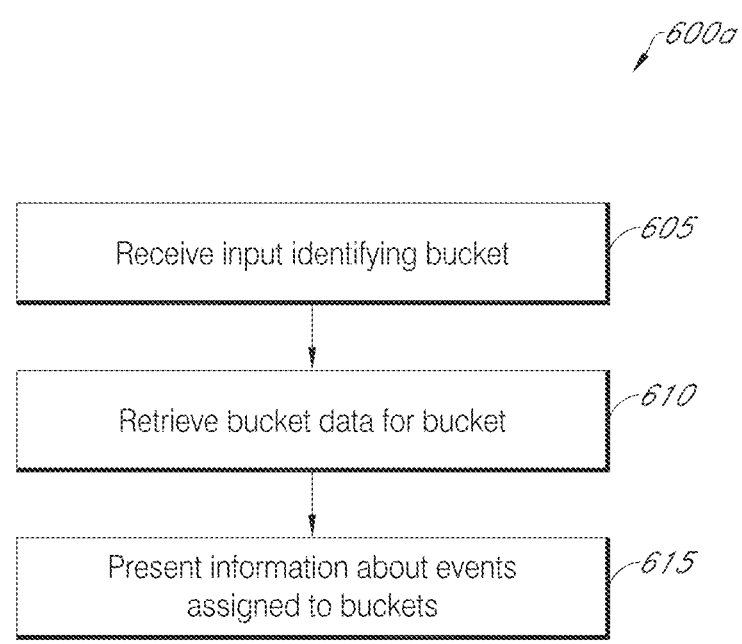
FIGS. 6A and 6B illustrate flowcharts of embodiments of processes for presenting bucket details.
Figure 6B:
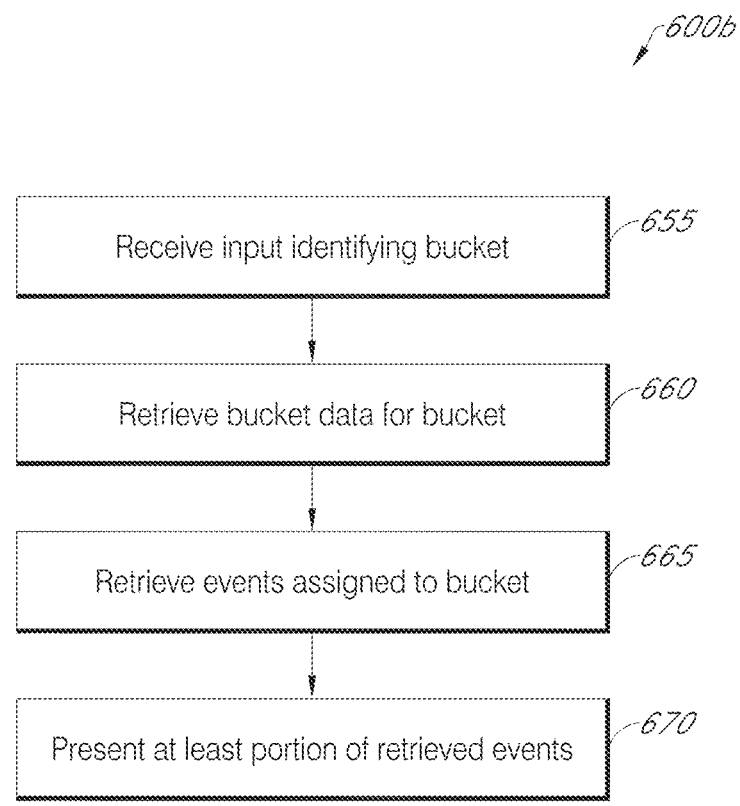

FIGS. 6A and 6B illustrate flowcharts of embodiments of processes 600a and 600b for presenting bucket details. At blocks 605 and 655, event detailer 240 receives an input corresponding to an identification of a bucket. The input can include, e.g., an identification that a bucket has been clicked on or hovered over and can further identify the bucket. Using the bucket identification, event detailer 240 can retrieve information about the bucket from bucket data store 225. The information can include, e.g., the bucket's time (e.g., which can include a time range) and can include an identification of events assigned to the bucket. Event detailer 240 can retrieve information about the identified events from event data store 215. In some instances (e.g., at block 665), entire events are retrieved from event data store 215.

Visualization engine 235 presents information about events assigned to the bucket at blocks 615 and 670. The information can include part or all of one or more events assigned to the bucket. FIGS. 3A-3B show examples of a hover window 330 and a sign board 335 showing event details. The type of information that is presented can depend on a number of events assigned to the bucket (e.g., one or multiple), the type of input (e.g., hover or click) and/or a type of event. Alternatively, drill down views can differ in the ways previously mentioned.

Exemplary Definitions of Notable Events

Figure 7:
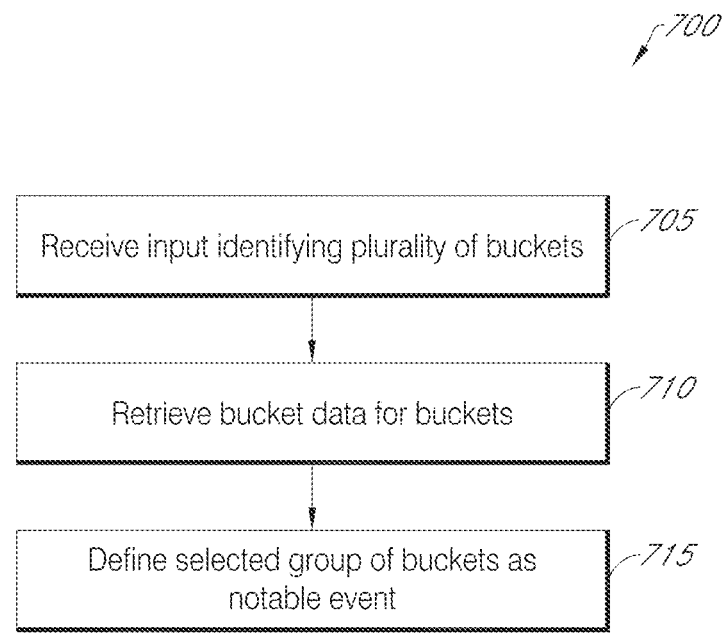
FIG. 7 illustrates a flowchart of an embodiment of a process for defining notable events.

FIG. 7 illustrates a flowchart of an embodiment of a process 700 for defining a notable event. Process 700 begins at block 705, where swim-lane query engine 205 detects input corresponding to an identification of a plurality of buckets. The plurality of buckets can be within a single lane or in a set of lanes. The input can include a selection of individual buckets or a selection of an area that includes the buckets.

Figure 8:
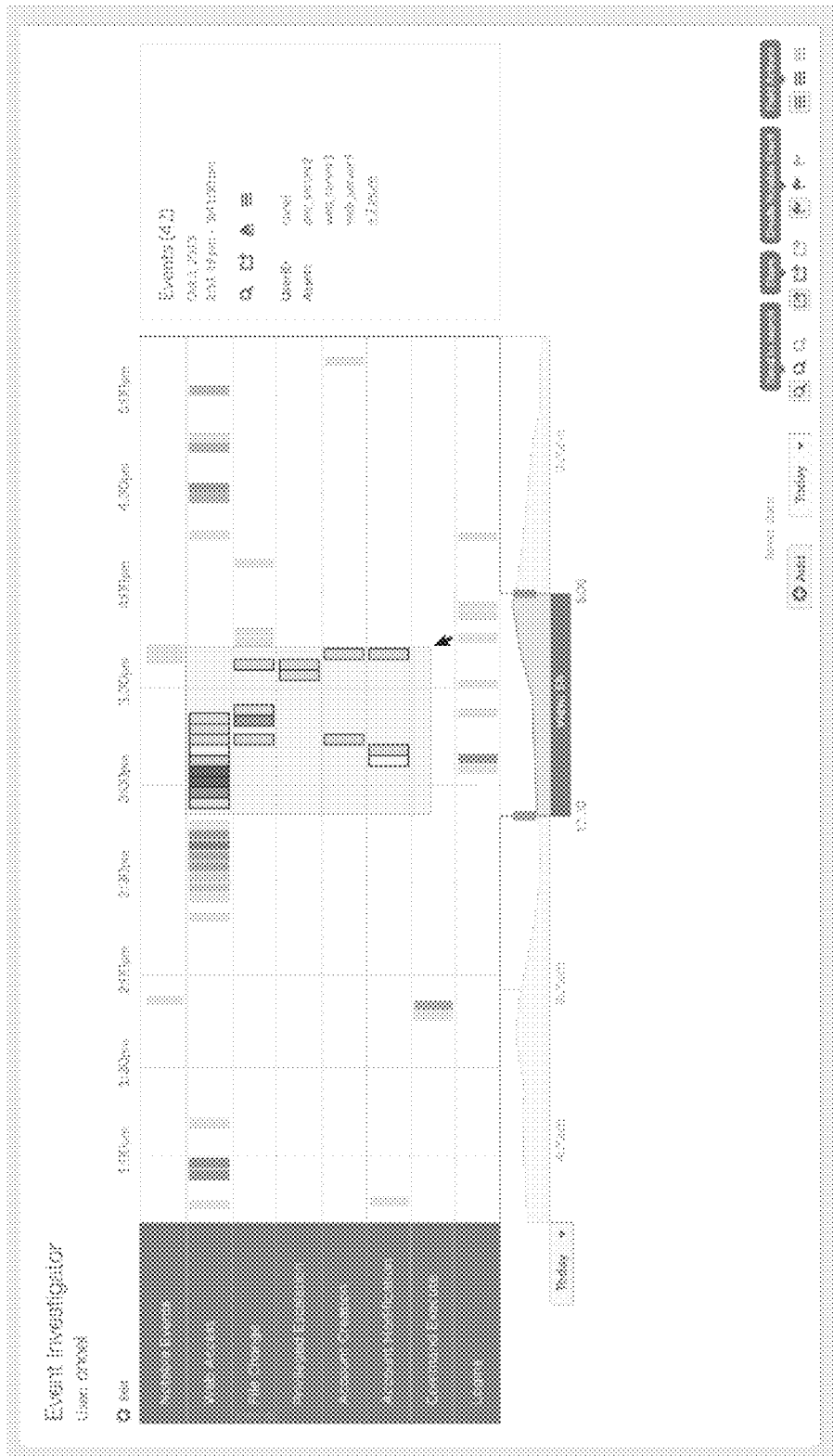
FIG. 8 illustrates an example of a swim-lane visualization with bucket selection.

FIG. 8 illustrates an example of a swim-lane visualization with selection of a group of buckets. In this depiction, 20 buckets across 5 lanes have been selected. The ability to reorder lanes can enable a user to align lanes of interest prior to defining such multi-lane buckets.

At block 710, data for the selected buckets is retrieved and may be displayed in a hover box and/or sign board. At block 715, the set of events in the selected group of buckets is defined as a notable event. Thereafter, a bucket can be added to the top notable-event swim lane to represent the new notable event. The notable event can be named, e.g., according to a name received as an input. An urgency state can also be assigned to the event and can be based on received input identifying the state. These statuses can then allow visualizations to include swim lanes with only those notable events at or above a particular urgency state (e.g., medium or high). FIG. 9 provides a display of previously defined notable events and the information about each of the displayed notable events.

Exemplary Systems for Generating, Storing and Retrieving Events

As noted above, the visualization techniques described herein can be applied to a variety of types of events, including those generated and used in SPLUNK® ENTERPRISE. Further details of underlying architecture of SPLUNK® ENTERPRISE are now provided.

Figure 10:
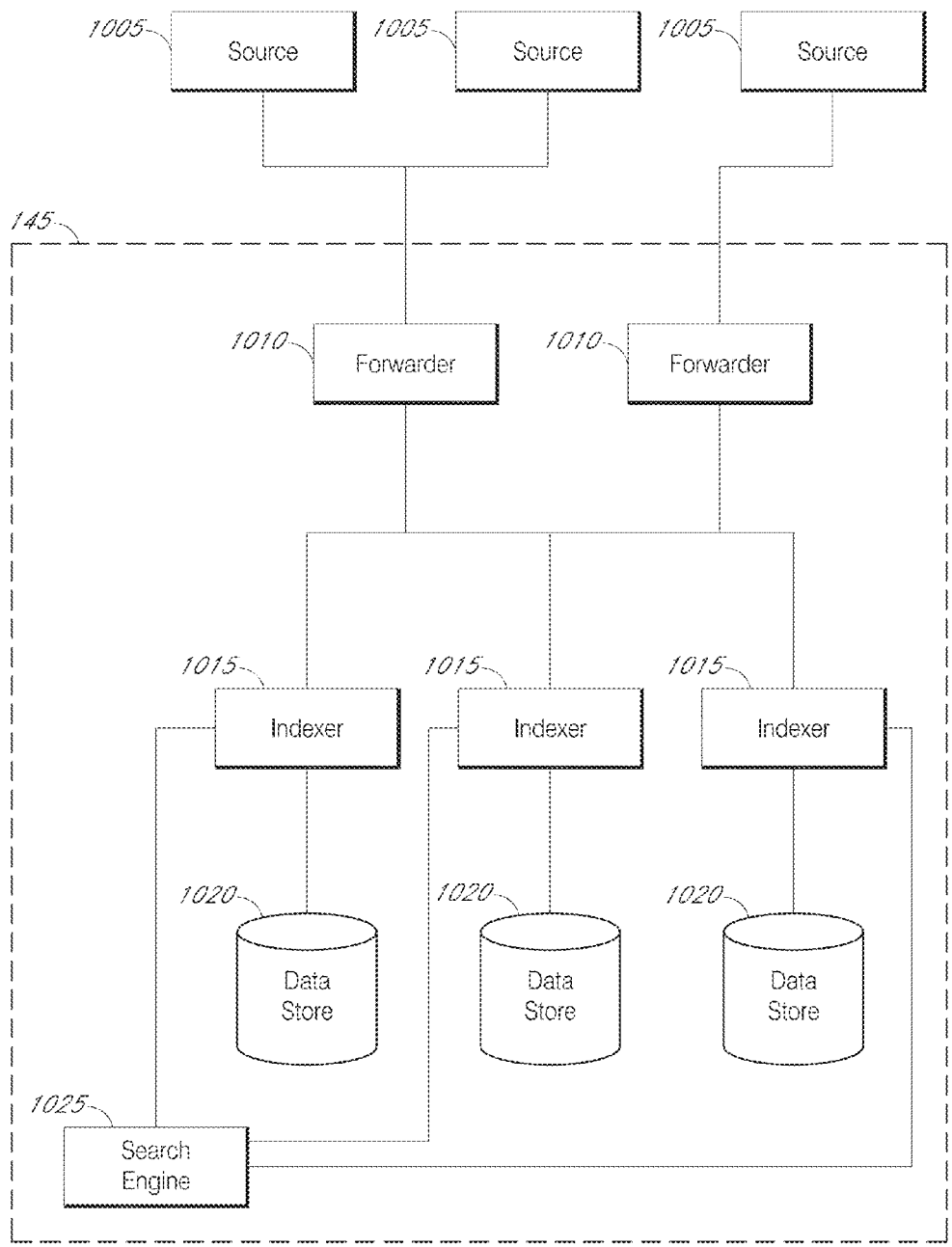
FIG. 10 shows a block diagram of an embodiment of a data intake and query system.

FIG. 10 shows a block diagram of SPLUNK® ENTERPRISE's data intake and query system, which provides an exemplary embodiment of a data intake and query system 145. Generally, the system 145 includes one or more forwarders 1010 that collect data from a variety of different data sources and forwards the data to one or more indexers 1015. The data typically includes streams of time-series data. Time-series data refers to any data that can be segmented such that each segment can be associated with a time stamp. The data can be structured, unstructured, or semi-structured and can come from files and directories. Unstructured data is data that is not organized to facilitate the extraction of values for fields from the data, as is often the case with machine data and web logs, two popular data sources for SPLUNK® ENTERPRISE.

Figure 11:
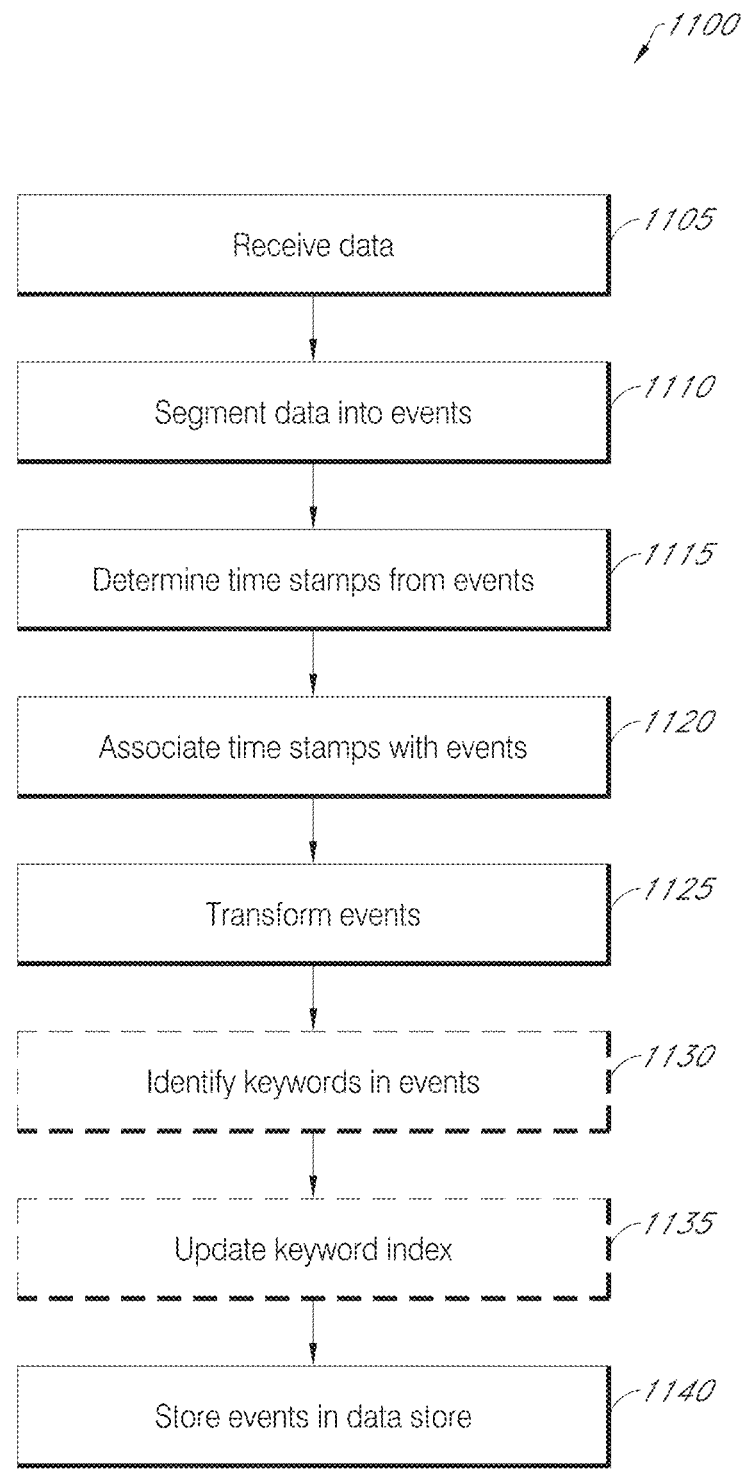
FIG. 11 illustrates a flowchart of an embodiment of a process for storing collected data.

FIG. 11 is a flowchart of a process that indexers 1015 may use to process, index, and store data received from the forwarders 1010. At block 1105, an indexer 1015 receives data from a forwarder 1010. At block 1110, the data is segmented into events. The events can be broken at event boundaries, which can include character combinations and/or line breaks. In some instances, event boundaries are discovered automatically by the software, and in other instances, they may be configured by the user.

A time stamp is determined for each event at block 1115. The time stamp can be determined by extracting the time from data in the event or by interpolating the time based on time stamps from other events. In alternative embodiments, a time stamp may be determined from the time the data was received or generated. The time stamp is associated with each event at block 1120. For example, the time stamp may be stored as metadata for the event.

At block 1125, the data included in a given event may be transformed. Such a transformation can include such things as removing part of an event (e.g., a portion used to define event boundaries) or removing redundant portions of an event. A client may specify a portion to remove using a regular expression or any similar method.

Optionally, a key word index can be built to facilitate fast keyword searching of events. To build such an index, in block 1130, a set of keywords contained in the events is identified. At block 1135, each identified keyword is included in an index, which associates with each stored keyword pointers to each event containing that keyword (or locations within events where that keyword is found). When a keyword-based query is received by an indexer, the indexer may then consult this index to quickly find those events containing the keyword without having to examine again each individual event, thereby greatly accelerating keyword searches.

The events are stored in a data store at block 1140. The data can be stored in working, short-term and/or long-term memory in a manner retrievable by query. The time stamp may be stored along with each event to help optimize searching the events by time range.

In some instances, the data store includes a plurality of individual storage buckets, each corresponding to a time range. An event can then be stored in a bucket associated with a time range inclusive of the event's time stamp. This not only optimizes time based searches, but it can allow events with recent time stamps that may have a higher likelihood of being accessed to be stored at preferable memory locations that lend to quicker subsequent retrieval (such as flash memory instead of hard-drive memory).

As shown in FIG. 10, data stores 1020 may be distributed across multiple indexers, each responsible for storing and searching a subset of the events generated by the system. By distributing the time-based buckets among them, they can find events responsive to a query in parallel using map-reduce techniques, each returning their partial responses to the query to a search head that combines the results together to answer the query. This query handling is illustrated in FIG. 12.

At block 1205, a search heard receives a query from a search engine. At block 1210, the search head distributes the query to one or more distributed indexers. These indexers can include those with access to data stores having events responsive to the query. For example, the indexers can include those with access to events with time stamps within part or all of a time period identified in the query. At block 1215, one or more indexers to which the query was distributed searches its data store for events responsive to the query. To determine events responsive to the query, a searching indexer finds events specified by the criteria in the query. This criteria can include that the events have particular keywords or contain a specified value or values for a specified field or fields (because this employs a late-binding schema, extraction of values from events to determine those that meet the specified criteria occurs at the time this query is processed). It should be appreciated that, to achieve high availability and to provide for disaster recovery, events may be replicated in multiple data stores, in which case indexers with access to the redundant events would not respond to the query by processing the redundant events. The indexers may either stream the relevant events back to the search head or use the events to calculate a partial result responsive to the query and send the partial result back to the search head. At block 1220, the search head combines all the partial results or events received from the parallel processing together to determine a final result responsive to the query.

Figure 12:
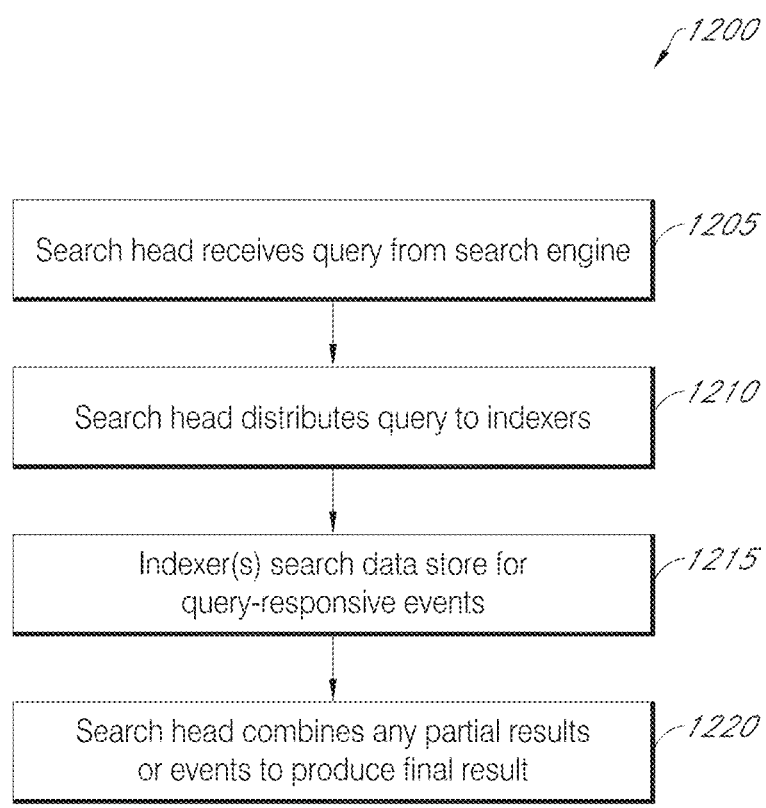
FIG. 12 illustrates a flowchart of an embodiment of a process for generating a query result.

Data intake and query system 145 and the processes described with respect to FIGS. 10-12 are further discussed and elaborated upon in Carasso, David. *Exploring Splunk Search Processing Language (SPL) Primer and Cookbook.* New York: CITO Research, 2012 and in Ledion Bitincka, Archana Ganapathi, Stephen Sorkin, and Steve Zhang. *Optimizing data analysis with a semi-structured time series database.* In SLAML, 2010. Each of these references is hereby incorporated by reference in its entirety for all purposes.

Data Modeling and Associated User Interface for Defining Event Types for Swim Lanes As noted, the query defining the event type for a swim lane may be entered by a user by simply typing in a query. But in alternative embodiments, a user-interface based on data modeling may provide a user with a simpler way to specify an event type for a swim lane without having to know a query language Such a user interface could be generated by a data-model engine 245.

A data model pertaining to a set of events may contain a set of sub-models. Typically, a data model may be set up by a data analyst familiar with the information contained in the events to make it easier for other, less technical users to create and run queries on that data and generate reports from that data.

Specifically, a given sub-model defines a schema for a subset of the events in the data store. More specifically, it defines one or more fields and the subset of events in the data store to which those fields can be applied. As with other schema, each field is defined by an extraction rule specifying how to extract a value for that field from each of the events for which that field has been defined (the extraction rules are often defined by regular expressions, or regexes, but they need not be).

The sub-models in a data model may be arranged in a hierarchy presented in a user interface, with each sub-model being user selectable. A lower level sub-model further constrains the schema from a sub-model higher in the hierarchy by either adding additional fields or narrowing the set of events to which fields higher in the hierarchy can be applied. Selection of a sub-model constrains any subsequent search to the set of events and fields associated with that sub-model.

A particularly useful application of this data modeling concept is to make it easier for nontechnical users to create searches without having to learn the search language for the data store. Once a data model has been set up, a graphical data model hierarchy may be presented. If the user selects a particular sub-model, a user-interface will be presented that displays the various fields defined for the particular sub-model. Through a nice user interface, the user can then specify criteria for those predefined fields in the sub-model. A query will then be automatically generated that will search only those events associated the sub-model (and for which the fields presented in the UI were defined) and using the criteria specified for the fields through the user interface. Changing a selection of a sub-model changes the set of events that can be searched and the fields for which criteria can be entered in the user interface to those fields and events associated with the chosen sub-model.

In one embodiment, a user interface button may be presented that enables the user to turn a query generated through this data-modeling based user interface into a query defining an event type for a swim lane.

Data modeling and the use of a user interface based on data models to gather criteria from a user with which to automatically construct a relevant query is technology included in SPLUNK® ENTERPRISE version 6.0; it is also described in U.S. application Ser. No. 13/607,117, which is hereby incorporated by reference in its entirety for all purposes.

Figure 13:
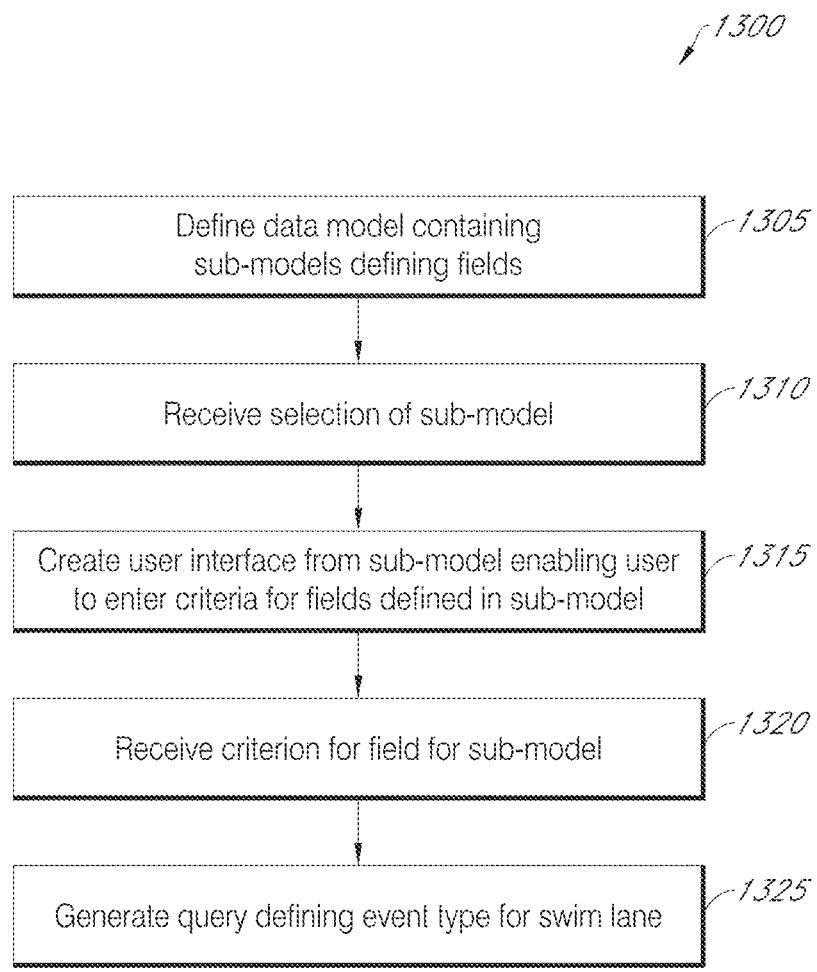
FIG. 13 illustrates a flowchart of an embodiment of a process for using a data model to generate a query.

FIG. 13 is a flowchart of a process 1300 for using a data model to generate a swim lane. At block 1305, data model engine 245 defines a data model or enables a user to define one. The data model includes a plurality of sub-models, each of which defines a set of fields. These field definitions provide the ability to subsequently search events for events that include particular values of a given field or for events that include a particular field.

At block 1310, visualization engine 235 receives a selection of a sub-model. For example, an initial user interface may present representations of sub-models. A user may select one by clicking on a particular representation, entering a name of a sub-model, etc. In some instances, the user may select a sub-model by selecting a field that is associated with a particular sub-model.

At block 1315, visualization engine 235 creates a user interface based on the selection of the sub-model. The interface may identify the set of fields defined by the sub-model. The interface may further identify one or more constraints on a given field. Thus, in some instances, a user may be presented with a comprehensive set of values for a field (e.g., a list or range), such that the user can identify one or more values of interest for the field.

At block 1320, visualization engine 235 receives a criterion for each of one or more fields for the sub-model through the user interface. For example, the user may select a value for a field (e.g., which can include selecting one or more endpoints of a range). The identification of the criterion can itself be indicative that the criterion is to be used to define an event type for a swim lane, or a separate indication of such may be received. For example, after identifying one or more field values or ranges, a user may indicate that the criterion is complete and/or that the criterion is to be used to collect events to be represented in a particular swim lane (e.g., swim lane #2).

At block 1325, swim-lane query engine 205 generates a query defining an event type. This may be done in response to a user indicating that the query should be used as the basis for a swim lane. The definition is based on the criterion received in block 1320 and a definition of one or more corresponding fields in the selected sub-model. For example, the query may include an indication that events should be returned if the event includes a particular value for a particular field. Retrieved events can then be represented in a swim lane in a visualization as described in detail herein.

Accelerating Swim Lane Generation by Using Intermediate Query Summaries

SPLUNK® ENTERPRISE can accelerate some queries used to periodically generate reports that, upon each subsequent execution, are intended to include updated data. To accelerate such reports, a summarization engine periodically generates a summary of data responsive to the query defining the report for a defined, non-overlapping subset of the time period covered by the report. For example, where the query is meant to identify events meeting specified criteria, a summary for a given time period may include only those events meeting the criteria. Likewise, if the query is for a statistic calculated from events, such as the number of events meeting certain criteria, then a summary for a given time period may be the number of events in that period meeting the criteria.

Because the report, whenever it is run, includes older time periods, a summary for an older time period can save the work of having to re-run the query on a time period for which a summary was generated, so only the newer data needs to be accounted for. Summaries of historical time periods may also be accumulated to save the work of re-running the query on each historical time period whenever the report is updated.

A process for generating such a summary or report can begin by periodically repeating a query used to define a report. The repeated query performance may focus on recent events. The summarization engine determines automatically from the query whether generation of updated reports can be accelerated by creating intermediate summaries for past time periods. If it can, then summarization engine 250 periodically creates a non-overlapping intermediate summary covering new data obtained during a recent, non-overlapping time period and stores the summary in summary data store 255.

In parallel to the creation of the summaries, the query engine schedules the periodic updating of the report defined by the query. At each scheduled report update, the query engine determines whether intermediate summaries have been generated covering parts of the time period covered by the current report update. If such summaries exist, then the report is based on the information from the summaries; optionally, if additional data has been received that has not yet been summarized but that is required to generate a complete report, then the query is run on this data and, together with the data from the intermediate summaries, the updated current report is generated. This process repeats each time an updated report is scheduled for creation.

As noted, this report acceleration method is used by SPLUNK® ENTERPRISE. It is also described in U.S. patent application Ser. No. 13/037,279, which is hereby incorporated by reference in its entirety for all purposes.

This same report acceleration method can be used to accelerate a query used to define the event type for a swim lane and gather the events for that swim lane. Specifically, the time selector in the swim lane visualization enables the user at any time to adjust the timeline axis to request a visualization including updated events from a recent time period as well as events responsive to the event type for the swim lane from older time periods. So visualization engine 150 can accelerate swim lane generation by having a summarization engine 250 constantly create intermediate summaries covering discrete non-overlapping time periods of events that meet the event type definition for a swim lane. When a time range is requested for a swim lane visualization, rather then re-running the whole query over the entire time period to find the events that should be displayed, the visualization engine can make use of the intermediate summaries for the query that cover time periods included in the time period for which the visualization is requested.

Figure 14:
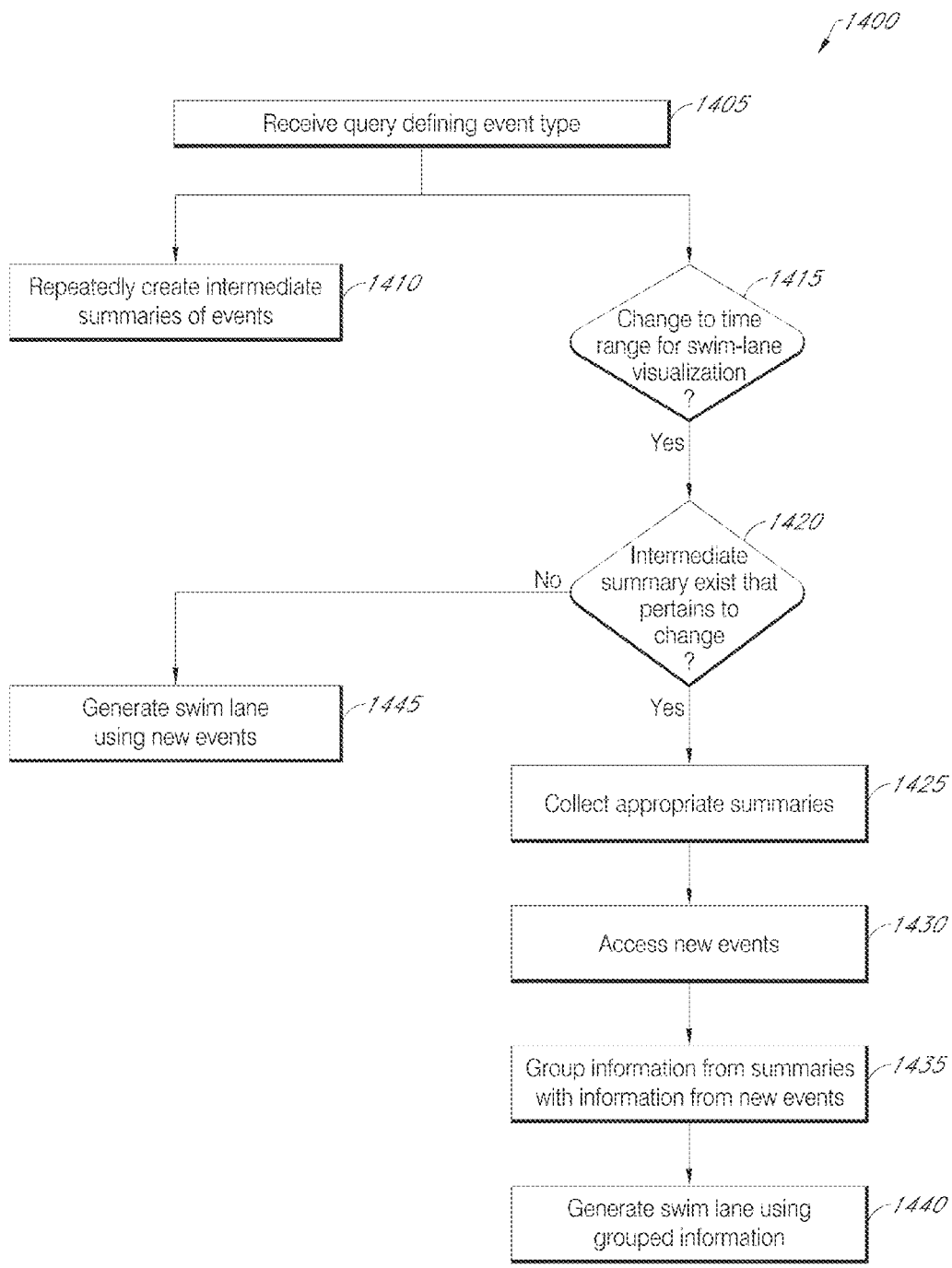
FIG. 14 illustrates a flowchart of an embodiment of a process for using intermediate information summaries to accelerate the generation of reports that a query indicates is intended to be periodically run and updated with new data.

FIG. 14 is a flow chart showing how to accelerate swim lane generation using intermediate summaries. At block 1405, a query defining an event type for a swim lane is received. At block 1410, summarization engine 250 repeatedly creates non-overlapping, intermediate summaries of events meeting the event type definition for the swim lane. For example, data intake and query system 145 can continuously or repeatedly collect data. Summarization engine 250 can then periodically create a new intermediate summary to summarize recently collected data. Each summary can therefore be associated with an event type and a time range that is indicative of time stamps of events that are summarized in the summary.

In parallel, at block 1415, time-period definer 210 determines whether a time range for the swim-lane visualization has changed. In some instances, a user may be viewing a visualization of a first time range and may then change the range to a second time range. In some instances, a user makes a new request to view a visualization based on a previous swim-lane definition. For example, queries for each of 5 swim lanes may be defined. A user may view a visualization with a "last 24 hours" and then close a program. If the user subsequently opens the program and requests the visualization, the time range will have changed, and block 1415 would be answered in the affirmative. In some instances, a user makes no active change to a time range, but a previous definition of a time range is relative. For example, a user can indicate that the time range is "last 24 hours". The visualization may then update itself periodically to include new data. In preparation for each update, block 1415's determination can be affirmative.

When the time range has changed, process 1400 continues to block 1420, where summarization engine 250 determines whether the new time range includes time ranges covered by intermediate summaries of events for the event type defining the swim lane. In some instances, this determination includes identifying a portion of the new time range not included in the previous time range. It can then be determined whether this portion is included in time ranges of intermediate summaries.

When it is determined that an intermediate summary for the event type is associated with a time range that includes a portion (e.g., any portion or a new portion) of the new time range, process 140 continues to block 1425. There, summarization engine 250 collects one or more intermediate summaries for the event type and associated with at least a portion of the time range. At block 1430, bucket engine 220 collects any new events not summarized in collected summaries. Bucket engine 220 then combines information from the collected summaries with information from the new events. For example, in one instance, the collected summary tables indicate time stamps of older events. Bucket engine can use this information, as well as time stamps of the new events to generate a set of buckets, indicative of the combined events' time stamps.

At block 1440, visualization engine 235 generates a swim lane using the grouped information. For example, the swim lane can represent buckets including events represented in intermediate summaries and new events. When, at block 1420, summarization engine 250 determines that no summaries exist pertaining to the new time range, process 1445 continues to block 1445, where visualization engine 235 generates a swim lane using only new events, as described herein.

It will be appreciated that process 1400 may be modified to omit blocks 1430 and 1435. This modification may be appropriate when existing summaries sufficiently or completely characterize events of the event type in the new time range.

Several embodiments disclosed herein indicate that a two-dimensional data object can be generated. For example, a scatter plot can compare an access count to an age since registration. It will be appreciated that, in some instances, the object can represent more than two dimensions. For visual presentations, a scatter plot could be enhanced such that a size, color, texture, and/or animation of individual points represents a value of another dimension.

It will also be appreciated that disclosed embodiments could be extended to allow a client to identify a specific notable event to be white- or blacklisted in a display of notable events. Such methods are described in U.S. application Ser. No. 13/956,285, which is hereby incorporated by reference in its entirety for all purposes.

Exemplary Computer Architecture

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a data store management system, an operating system, or a combination of one or more of them. A propagated signal is an artificially generated signal, e.g., a machine generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, architecture provider or reviewer, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
receiving a selection of a time period through a graphical user interface;
for each of a plurality of event types that define criteria for selection of events:
identifying a set of events, wherein each event in the set of events matches the event type, wherein each event in the set of events is associated with an event time that is within the time period, and wherein at least some events in the set of events include machine data;
assigning, for each event in the set of events, the event to a bucket in a set of buckets, wherein each bucket in the set of buckets is associated with a bucket time that encompasses the event times of all the events assigned to the bucket; and
generating a visual interface that includes a graphical representation of each bucket in the set of buckets at a position along a timeline axis that reflects the bucket time; and
displaying the generated visual interfaces, wherein the generated visual interfaces are displayed to be parallel to each other.

2. The method of claim 1, wherein the graphical representation of a bucket in the set of buckets displayed in the generated visual interfaces also indicates a number of events assigned to the bucket.

3. The method of claim 1, wherein the graphical representation of a bucket in the set of buckets displayed in the generated visual interfaces uses color or color shading to indicate a number of events assigned to the bucket.

4. The method of claim 1, wherein the graphical representation of each bucket in the set of buckets displayed in the generated visual interfaces is a same size.

5. The method of claim 1, wherein each bucket in the set of buckets contains only one event, and wherein the bucket time for the bucket matches the event time for the event assigned to the bucket.

6. The method of claim 1, wherein a plurality of events are assigned to a bucket of the plurality of buckets.

7. The method of claim 1, further comprising:
receiving an input corresponding to an identification of a bucket of the set of buckets represented in one of the generated visual interfaces; and
displaying additional information about one or more events assigned to the identified bucket.

8. The method of claim 1, further comprising:
receiving an input corresponding to an identification of a bucket represented in one of the generated visual interfaces; and
displaying at least a portion of one or more events assigned to the identified bucket.

9. The method of claim 1, further comprising:
receiving input reflecting selection of a generated visual interface or a bucket in a generated visual interface; and
displaying a drill-down view that provides further information about events in the generated visual interface.

10. The method of claim 1, further comprising:
receiving input reflecting selection of a generated visual interface or a bucket in a generated visual interface; and
displaying a drill-down view based on a drill-down query different from a query used to select events for the generated visual interface.

11. The method of claim 1, wherein the generated visual interfaces are displayed in an order relative to each other, and wherein the method further comprises:
receiving an input corresponding to an identification of a new order for displaying the generated visual interfaces; and
displaying the generated visual interfaces in the new order.

12. The method of claim 1, wherein a query includes a search criterion corresponding to one of the plurality of event types, and further comprising retrieving events for the generated visual interface corresponding to the event type using the query.

13. The method of claim 1, further comprising:
displaying a user interface for receiving a search criterion for a field that is defined by a data model;
receiving the search criterion through the user interface;
receiving, through the user interface, an indication that the search criterion is to be used to generate a visual interface;
generating a query to retrieve events corresponding to the search criterion;
using the query to define the event type for the generated visual interface and to retrieve events relevant to the generated visual interface.

14. The method of claim 1, further comprising:
periodically storing an intermediate summary, wherein each intermediate summary in a set of intermediate summaries summarizes events of a same event type, wherein each intermediate summary is associated with a time range inclusive of event times of the events summarized in the summary; and
retrieving events from an intermediate summary of the set of intermediate summaries to accelerate the generation of one of the generated visual interfaces, wherein the time period includes the time range corresponding to the intermediate summary.

15. The method of claim 1, further comprising:
receiving a global constraint specifying criteria that all events represented in displayed generated visual interfaces are to meet; and
representing, in the displayed generated visual interfaces, only events that both are of one of the plurality of event types and that also satisfy the global constraint.

16. The method of claim 1, further comprising:
receiving a request identifying a further constraint that events assigned to buckets include only those events related to a particular asset or a particular user; and
representing, in the displayed generated visual interfaces, only events that both are of one of the plurality of event types and that also are related to the particular asset or the particular user.

17. The method of claim 1, further comprising, for an event type of the plurality of event types:
retrieving the set of events from a time-series data store, wherein the retrieved events include at least one of: raw data, machine data, unstructured data, or transformed raw data.

18. The method of claim 1, wherein an event assigned to a bucket of the set of buckets represented in one of the generated visual interfaces includes summarized data derived using a data reduction technique.

19. The method of clam 1, wherein an event assigned to a bucket of the set of buckets represented in one of the generated visual interfaces includes a notable event or an alert.

20. The method of claim 1, further comprising:
receiving a selection of one or more events;
receiving input indicative of a request that a notable event or alert corresponding to the selected one or more events be created; and
based on receiving the input indicative of the request, creating the notable event or alert corresponding to the selected one or more events.

* * * * *